United States Patent
Masuo et al.

(10) Patent No.: US 8,671,257 B2
(45) Date of Patent: Mar. 11, 2014

(54) MEMORY SYSTEM HAVING MULTIPLE CHANNELS AND METHOD OF GENERATING READ COMMANDS FOR COMPACTION IN MEMORY SYSTEM

(75) Inventors: Yoko Masuo, Iruma (JP); Wataru Okamoto, Yokohama (JP); Hironobu Miyamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 152 days.

(21) Appl. No.: 13/422,947

(22) Filed: Mar. 16, 2012

(65) Prior Publication Data

US 2012/0311235 A1 Dec. 6, 2012

(30) Foreign Application Priority Data

May 30, 2011 (JP) ................................. 2011-120933

(51) Int. Cl.
*G06F 12/00* (2006.01)
(52) U.S. Cl.
USPC ....................................................... 711/165
(58) Field of Classification Search
None
See application file for complete search history.

(56) References Cited

U.S. PATENT DOCUMENTS

| 7,913,061 B2 * | 3/2011 | Gorobets et al. .............. 711/220 |
| 2007/0150642 A1 | 6/2007 | Mae | |

FOREIGN PATENT DOCUMENTS

| JP | 2007-140628 A | 6/2007 |
| JP | 2009-211225 A | 9/2009 |
| JP | 2010-176702 A | 8/2010 |
| WO | WO 2009/110302 A1 | 9/2009 |

* cited by examiner

*Primary Examiner* — Hiep Nguyen
(74) *Attorney, Agent, or Firm* — Knobbe Martens Olson & Bear LLP

(57) ABSTRACT

According to one embodiment, a valid-cluster search module searches valid clusters included in first blocks, in each of channels, for compaction. A read command generator generates read commands used to read, in parallel, valid clusters to be migrated to a second block. The valid clusters searched in each of the channels comprise the valid clusters to be migrated. The valid clusters to be migrated correspond to a number of clusters simultaneously written to the second block and to a second number of channels in a first number of channels. A determination module determines the second number of channels corresponding to read commands to be generated next based on a situation of issuance of the read commands.

12 Claims, 6 Drawing Sheets

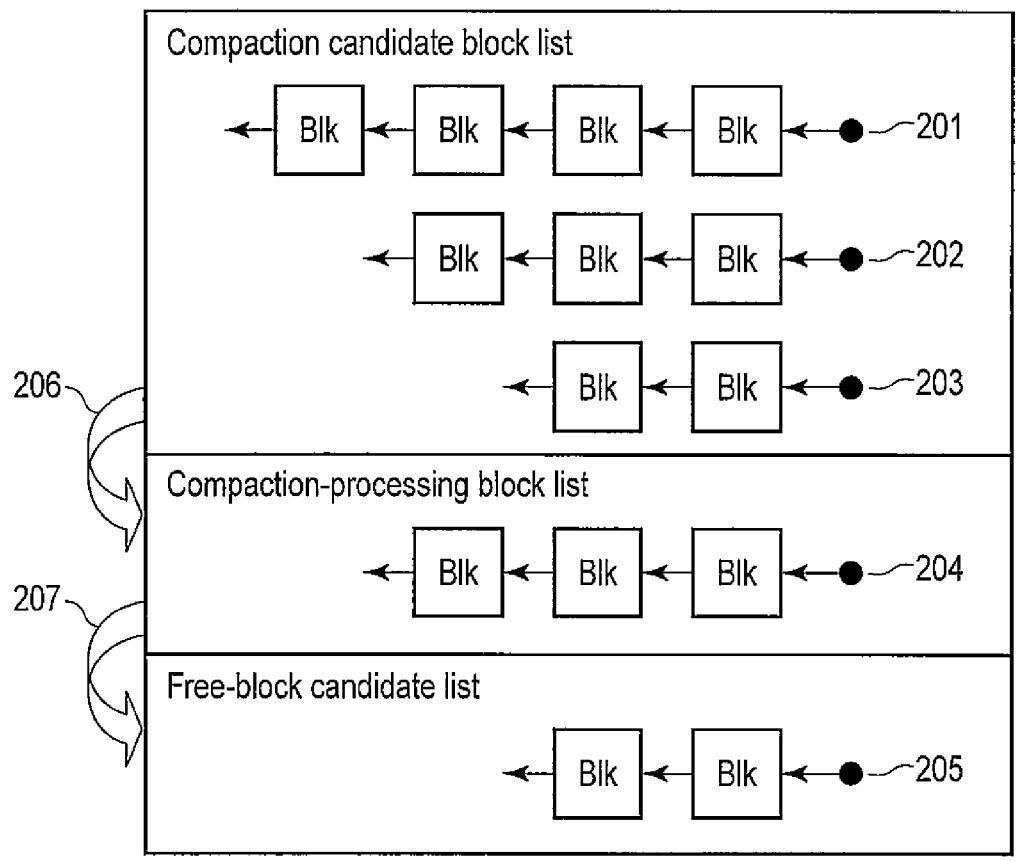
F I G. 2

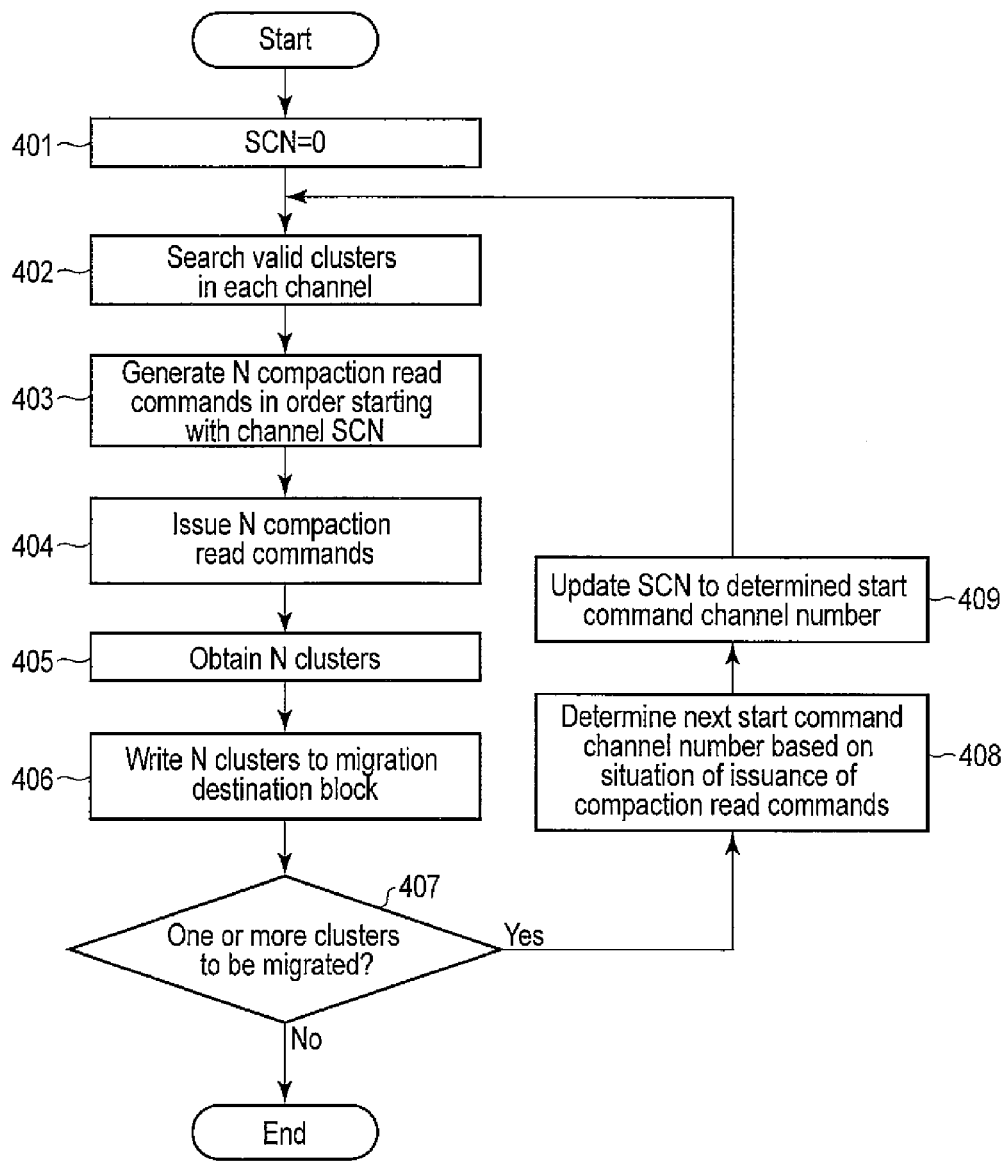
F I G. 4

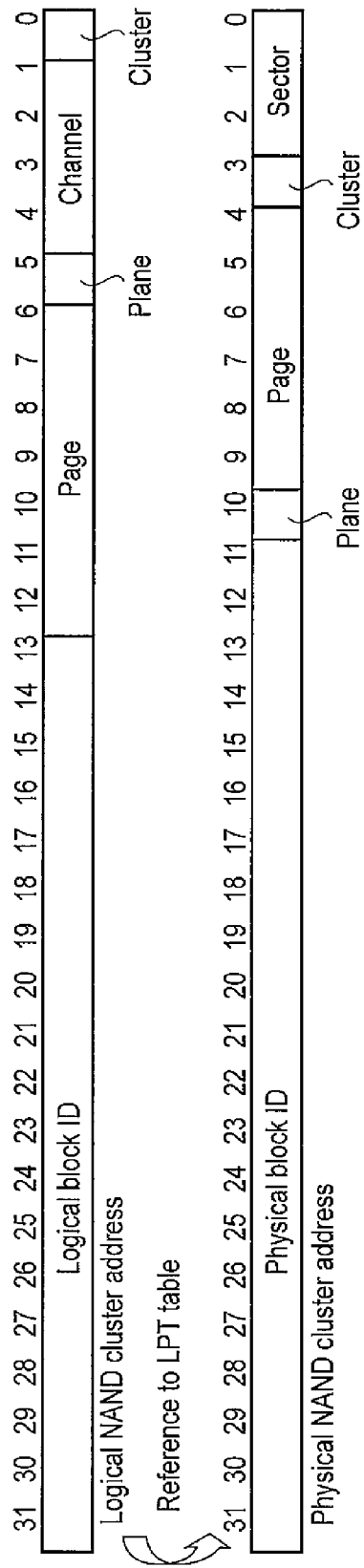
F I G. 6

United States Patent — US 8,671,257 B2

MEMORY SYSTEM HAVING MULTIPLE CHANNELS AND METHOD OF GENERATING READ COMMANDS FOR COMPACTION IN MEMORY SYSTEM

CROSS-REFERENCE TO RELATED APPLICATIONS

This application is based upon and claims the benefit of priority from prior Japanese Patent Application No. 2011-120933, filed May 30, 2011, the entire contents of which are incorporated herein by reference.

FIELD

Embodiments described herein relate generally to a memory system having multiple channels and a method of generating read commands for compaction in the memory system.

BACKGROUND

A NAND flash memory is known as a nonvolatile memory that requires erasure of data, for example, in units of blocks before data write. In the NAND flash memory, a unit of data erase and a unit of data read are generally different. Now, it is assumed that in a nonvolatile memory typified by the NAND flash memory, in which the unit of data erase and the unit of data read are different, data rewrite has progressed. In such a situation, blocks (logical blocks) may be in a fragmented state due to invalid (not the latest) data. Therefore, to allow the storage area of the nonvolatile memory to be effectively utilized, a process called compaction is carried out. The compaction is a process of collecting valid data from blocks whose data density is low and rewriting the collected data to another block.

In order to reduce the duration of the compaction process, various techniques have been proposed. For example, a technique has been proposed in which valid data is migrated in a stepwise fashion using a plurality of storage areas in which different units are used to manage data sizes. Thus, the conventional art requires dedicated storage areas for a faster compaction process. On the other hand, a memory system is known which comprises a nonvolatile memory typified by the above-described NAND flash memory and which has multiple channels on which a plurality of access commands are carried out in parallel.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a diagram showing an example of a configuration of block lists applied in the embodiment;

FIG. 4 is a flowchart illustrating an exemplary procedure for a compaction process applied in the embodiment;

FIG. 6 is a diagram showing an example of formats of a logical address and a physical address which are applied in the embodiment.

DETAILED DESCRIPTION

Various embodiments will be described hereinafter with reference to the accompanying drawings. In general, according to one embodiment, a memory system comprises a memory, a memory interface, a valid-cluster search module, a read command generator, a command issue module, and a determination module. The memory is configured to be accessed via a first number of channels. The memory interface is configured to access the memory in parallel via the first number of channels. The valid-cluster search module is configured to sequentially search valid clusters included in first blocks, in each of the channels, for compaction in which the valid clusters are migrated from the first blocks to a second block. The read command generator is configured to generate read commands used to read, in parallel, valid clusters to be migrated to the second block. The valid clusters searched in each of the channels comprise the valid clusters to be migrated. The valid clusters to be migrated correspond to a number of clusters simultaneously written to the second block and to a second number of channels in the first number of channels. The command issue module is configured to issue the read commands to the memory interface via the second number of channels. The determination module is configured to determine the second number of channels corresponding to read commands to be generated next based on a situation of issuance of the read commands.

Figure 1:
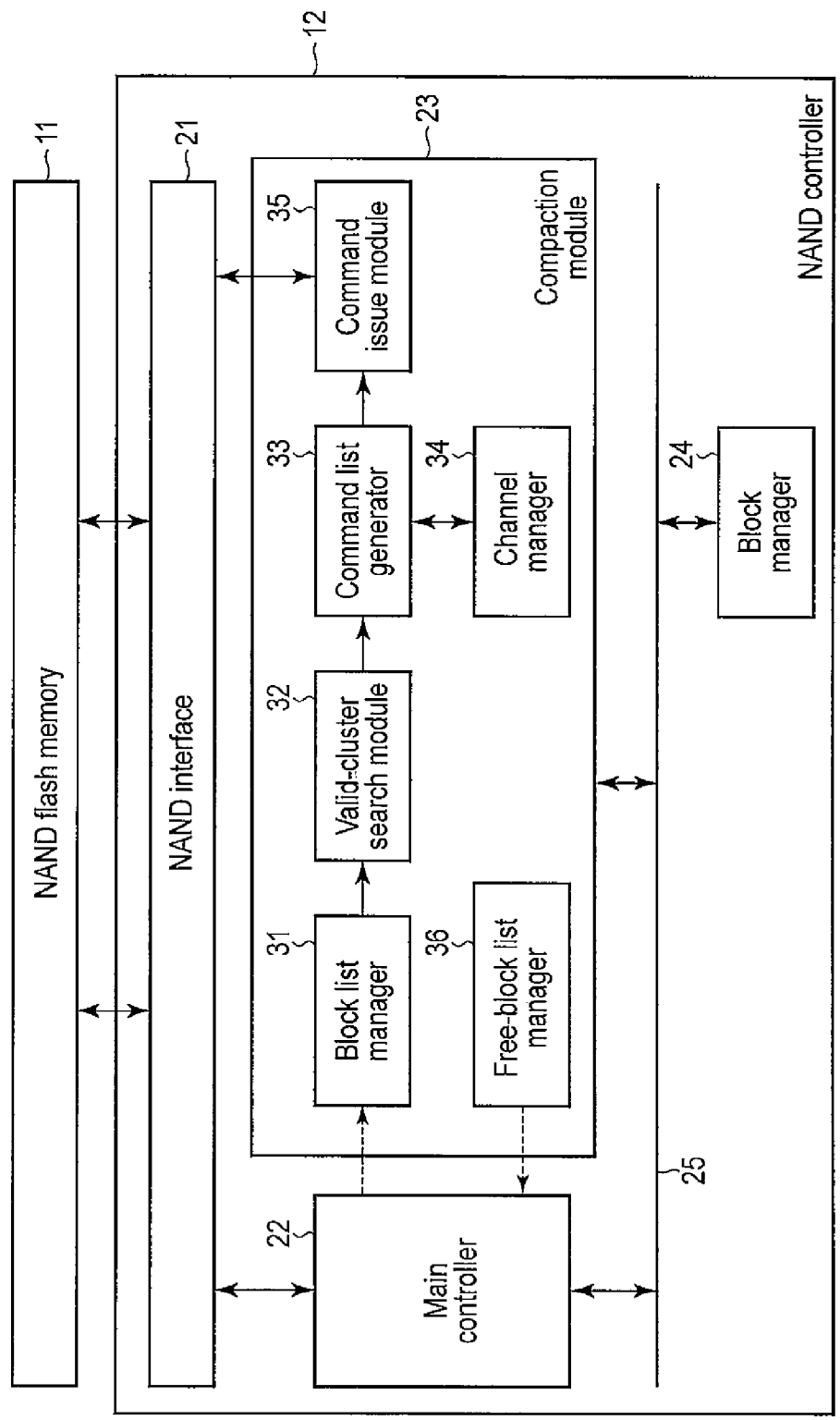
FIG. 1 is a block diagram showing an exemplary configuration of a memory system having multiple channels according to an embodiment.

FIG. 1 is a block diagram showing an exemplary configuration of a memory system having multiple channels according to an embodiment. In the present embodiment, a memory system 10 shown in FIG. 1 is connected to, for example, a host (not shown in the drawings). The host (host device) utilizes the memory system 10 as a storage device for the host.

The memory system 10 comprises a NAND flash memory 11 and a NAND controller 12. In the embodiment, the memory system 10 is a solid state drive (SSD) utilizing the NAND flash memory 11. The NAND flash memory 11 is a storage medium in which user data is stored. The NAND flash memory 11 comprises a plurality of NAND flash memory chips. The NAND flash memory 11 is configured to be accessed by the NAND controller 12 in parallel via a plurality of channels (that is, multiple channels) in accordance with a plurality of access commands. The memory system 10 need not be the SSD. Furthermore, instead of the NAND flash memory 11, a memory other than a NAND flash memory may be used provided that the memory can be accessed in parallel via a plurality of channels in accordance with a plurality of access commands. This memory is also configured such that data erase and data write use different units, similarly to the NAND flash memory.

The NAND controller 12 accesses the NAND flash memory 11 in accordance with requests from the host. In a memory access process, for example, a compaction process, the NAND controller 12 accesses the NAND flash memory 11 in units of blocks.

The NAND controller 12 comprises a NAND interface 21, a main controller 22, a compaction module 23, and a block manager 24. The NAND interface 21, the main controller 22, the compaction module 23, and the block manager 24 are interconnected via an internal bus 25.

The NAND interface 21 transmits and receives information between the NAND flash memory 11 and both the main controller 22 and the compaction module 23 (particularly, a command issue module 35 in the compaction module 23). In the embodiment, the NAND interface 21 is assumed to have 16 channels, 0, 1, . . . , and 15. The channel numbers of the channels 0, 1, . . . , and 15 are 0, 1, . . . , and 15 (decimal expression), respectively. Each of the channels 0, 1, . . . , and 15 is connected to two planes, 0 and 1. The plane numbers of the planes 0 and 1 are 0 and 1, respectively. Furthermore, it is assumed that one logical block comprises 64 pages (logical pages), 0, 1, . . . , and 63.

In the embodiment, both a write process and a read process can be carried out on 16 channels in parallel. In particular, the write process can be carried out on each page. That is, the write process via a channel p (in hexadecimal, p=0, 1, . . . , or F) (in decimal, p=0, 1, . . . , or 15) can be simultaneously carried out on 2 (planes)×2 clusters (=4 clusters). In contrast, the read process can be carried out on each cluster over the 16 channels in parallel. That is, the read process via the channel p is carried out on each of the four clusters in each page based on switching of a plane position and a cluster position.

If an error occurs which cannot be corrected even by use of an error correction code (ECC), the NAND interface 21 corrects the error location based on inter-channel data. This correction is referred to as inter-channel parity correction (ICP correction) or inter-channel error correction. In the embodiment, to enable each logical page in a logical block to be subjected to the ICP correction, any one of the 16 channels is allocated to the logical page for storing error correction data for the ICP correction. The channels allocated to the logical pages in the logical block are switched from on to another in a predetermined order. It should be noted, however, that a specified channel is allocated to all of the logical pages in the logical block. The error correction data for the ICP correction is, for example, parity data (inter-channel parity data) generated based on the data in the corresponding logical pages stored in the other 15 channels. The NAND interface 21 uses the parity data to carry out ICP correction required to correct the error location in a logical page containing valid clusters which page cannot be corrected even by use of ECC.

The main controller 22 controls modules such as the compaction module 23 and the block manager 24 which are connected to the internal bus 25. The compaction module 23 carries out compaction in which valid data (more specifically, valid clusters) is collected from a plurality of blocks (logical blocks) and rewritten to another block. The compaction module 23 comprises a block list manager 31, a valid-cluster search module 32, a command list generator 33, a channel manger 34, a command issue module 35, and a free-block list manager 36.

The block list manager 31 manages blocks corresponding to compaction candidates and blocks being subjected to a compaction process, using a list structure. The block list manager 31 may hold a list of compaction candidate blocks (compaction candidate block list) for each purpose (type) of compaction. The embodiment assumes three types of purposes for compaction. The three types are normal compaction (first compaction), compaction intended to correct an error (second compaction), and compaction intended for wear leveling (third compaction).

For the first compaction, the block list manager 31 checks the number of blocks that are unused and in a standby state (that is, free blocks). The free blocks are managed by the block manager 24. If the number of the free blocks is smaller than a specified value, the block list manager 31 starts the first compaction in order to avoid the exhaustion of free blocks.

For the second compaction, the block list manager 31 periodically diagnoses each block, using a read operation. If the number of error bits is greater than a specified value, the block list manager 31 migrates (saves) the data in the corresponding blocks to another block. The second compaction is also referred to as patrol refresh.

The life of the memory deice 10 depends on the number of erase operations and erase time intervals for each block. Thus, for prolonging the life of the memory system 10, the degrees of fatigue of all the blocks need to be leveled. This is referred to as wear leveling. The compaction intended for the wear leveling (that is, the third compaction) is started when a wear-leveling module (not shown in the drawings) determines the necessity of the wear leveling.

The free block list manager 36 manages blocks for which all valid clusters for compaction have been migrated (a migration request has been carried out); these blocks correspond to candidates for free blocks. In the embodiment, the free block list manager 36 manages the blocks corresponding to candidates for the free blocks using a list structure (free block list).

FIG. 2 shows an example of a configuration of block lists held and managed by the block list manager 31 and the command list generator 33 according to the embodiment. In FIG. 2, a compaction candidate block list 201 is a list of compaction candidate blocks (Blk) that can be applied for the first compaction purpose. A compaction candidate block list 202 is a list of compaction candidate blocks that can be applied for the second compaction purpose. A compaction candidate block list 203 is a list of compaction candidate blocks that can be applied for the third compaction purpose. A compaction-processing block list 204 is a list of blocks being subjected to a compaction process. The block lists 201 to 204 are held in the block list manager 31 (more specifically, in an area in a memory such as DRAM which is assigned to the block list manager 31). A free-block candidate list 205 is a list of blocks (free-block candidates) corresponding to candidates for the above-described free blocks.

The block list manager 31 sets priorities for the compaction candidate block lists 201 to 203 corresponding to the respective three types of compactions, based on the purpose. Then, based on the priorities, the block list manager 31 generates a compaction-processing block list 204. In the illustrated example of the compaction-processing block list 204 in FIG. 2, three blocks are subjected to a compaction process at a time. When the compaction progresses to reduce the blocks being processed, the block list manager 31 migrates compaction target blocks from any of the compaction candidate block lists 201 to 203 to the compaction-processing block list 204 as required in accordance with the above-described priorities, as shown by arrow 206; the block list manager 31 refills the compaction-processing block list 204 with the compaction target blocks from any of the compaction candidate block lists 201 to 203.

The free-block list manager 36 migrates those of the blocks managed by the compaction-processing block list 204 for which all the valid clusters have been migrated, to the free-block candidate list 205 as shown by arrow 206 in FIG. 2; the migrated blocks serve as the free-block candidates. Thereafter, to make the blocks migrated to the free-block candidate list 205 free, the free-block list manager 36 notifies the block manager 24 that the blocks migrated to the free-block candidate list 205 are to be made free. In the embodiment, block IDs that identify blocks are directly managed by the above-described compaction candidate block lists 201 to 203 compaction-processing block list 204, and free-block candidate list 205.

Figure 3:
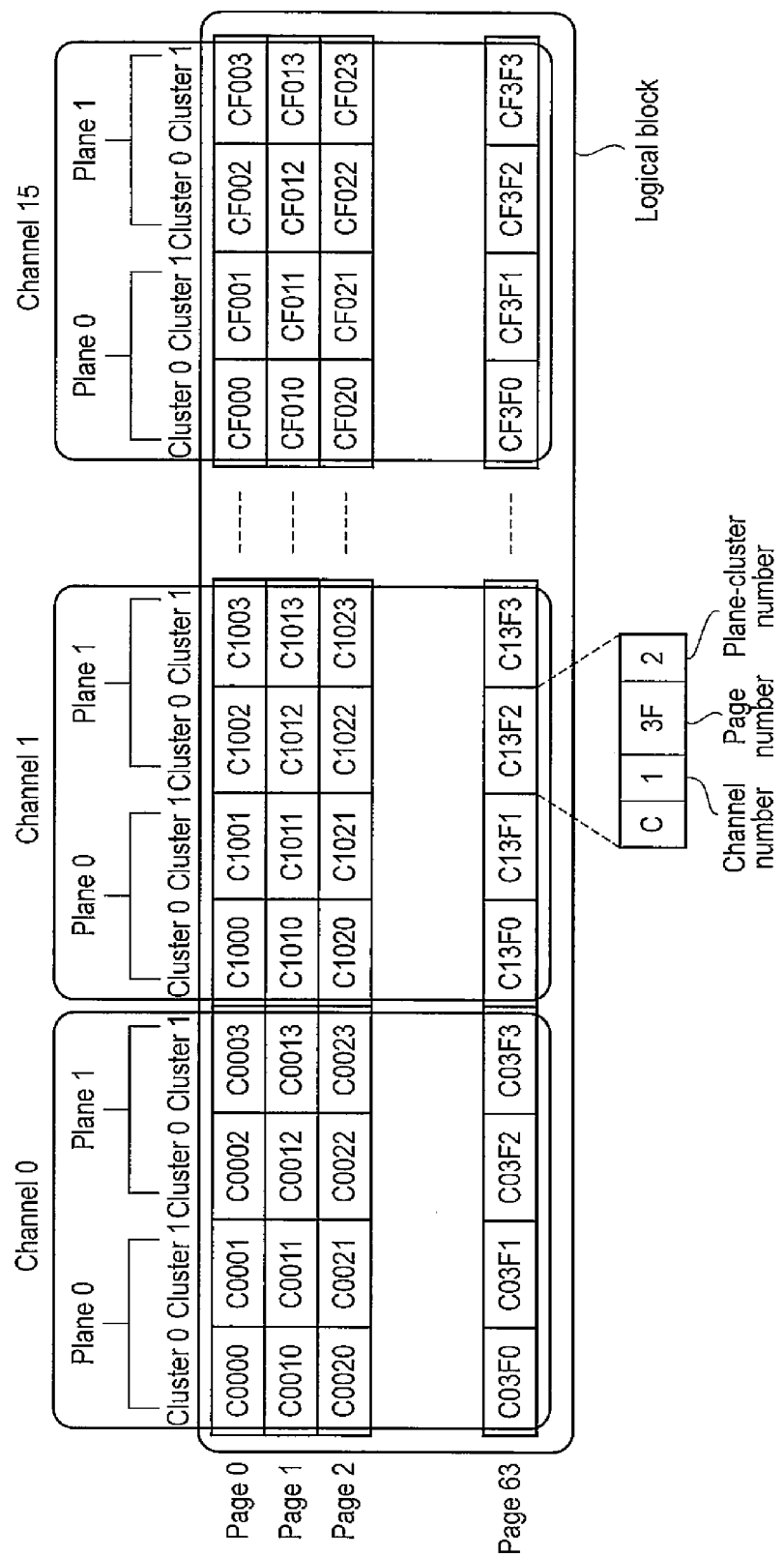
FIG. 3 is a diagram showing an example of a configuration of a logical block applied in the embodiment.

FIG. 3 shows an example of a configuration of a logical block applied in the embodiment. As shown in FIG. 3, the logical block applied in the embodiment comprises 64 pages (logical pages) from page 0 to page 63. Each of the pages comprises 64 clusters. That is, one logical block comprises 4,096 (64×64) clusters, C0000, C0001, C0002, C0003, C1000, C1001, C1002, C1003, ..., CF3F0, CF3F1, CF3F2, and CF3F3.

One cluster in the logical block is denoted as Cpqrs. Here, p (0, 1, ..., or F) is a single-digit hexadecimal number indicative of the channel number of a channel to which the cluster Cpqrs belongs, and qr (00, 01, ..., or 3F) is a two-digit hexadecimal number indicative of the page number of a page to which the cluster Cpqrs belongs. Furthermore, s(0, 1, 2, or 3) is a single-digit hexadecimal number indicative of a combination (plane-cluster number) of the plane number of a plane and the cluster number of a cluster in the channel to which the cluster Cpqrs belongs.

For example, s=0 denotes a combination of plane number 0 and cluster number 0, and s=1 denotes a combination of plane number 0 and cluster number 0. Additionally, s=2 denotes a combination of plane number 1 and cluster number 0, and s=3 denotes a combination of plane number 1 and cluster number 1.

The cluster Cpqrs in the logical block is identified by a combination of the channel number p, the page number qr, and the plane-cluster number s.

The cluster Cpqrs is written at the cluster position indicated by the plane-cluster number s on the plane indicated by the plane-cluster number s in the channel with the channel number p.

In the embodiment, 32 physical blocks are assigned to one logical block. The 32 physical blocks correspond to the planes 0 and 1 of each of the 16 channels 0, 1, ..., and 15. Each physical block comprises two clusters per page.

Now, with reference to a flow chart in FIG. 4, an exemplary procedure for the compaction process will be described which is carried out by the compaction module 23 in the NAND controller 12 of the memory system 10 shown in FIG. 1. First, the command list generator 33 of the compaction module 23 functions as a start channel setting module. Thus, the command list generator 33 sets an initial channel number as the channel number (hereinafter referred to as a start command channel number) SCN of a channel (hereinafter referred to as a start channel) corresponding to a start point for generation of a command list described below (block 401). The initial channel number is determined by the channel manager 34 and then sent to the command list generator 33, for example, at the beginning of a compaction process. Here, the initial channel number is 0, which is indicative of the channel 0.

The valid-cluster search module 32 searches the blocks (logical blocks) managed by the compaction process block list 204 for valid blocks used for compaction, in each channel p (block 402). To search for valid clusters in each channel p, the valid-cluster search module 32 holds search pointers Pp for the respective channels p.

Figure 5:
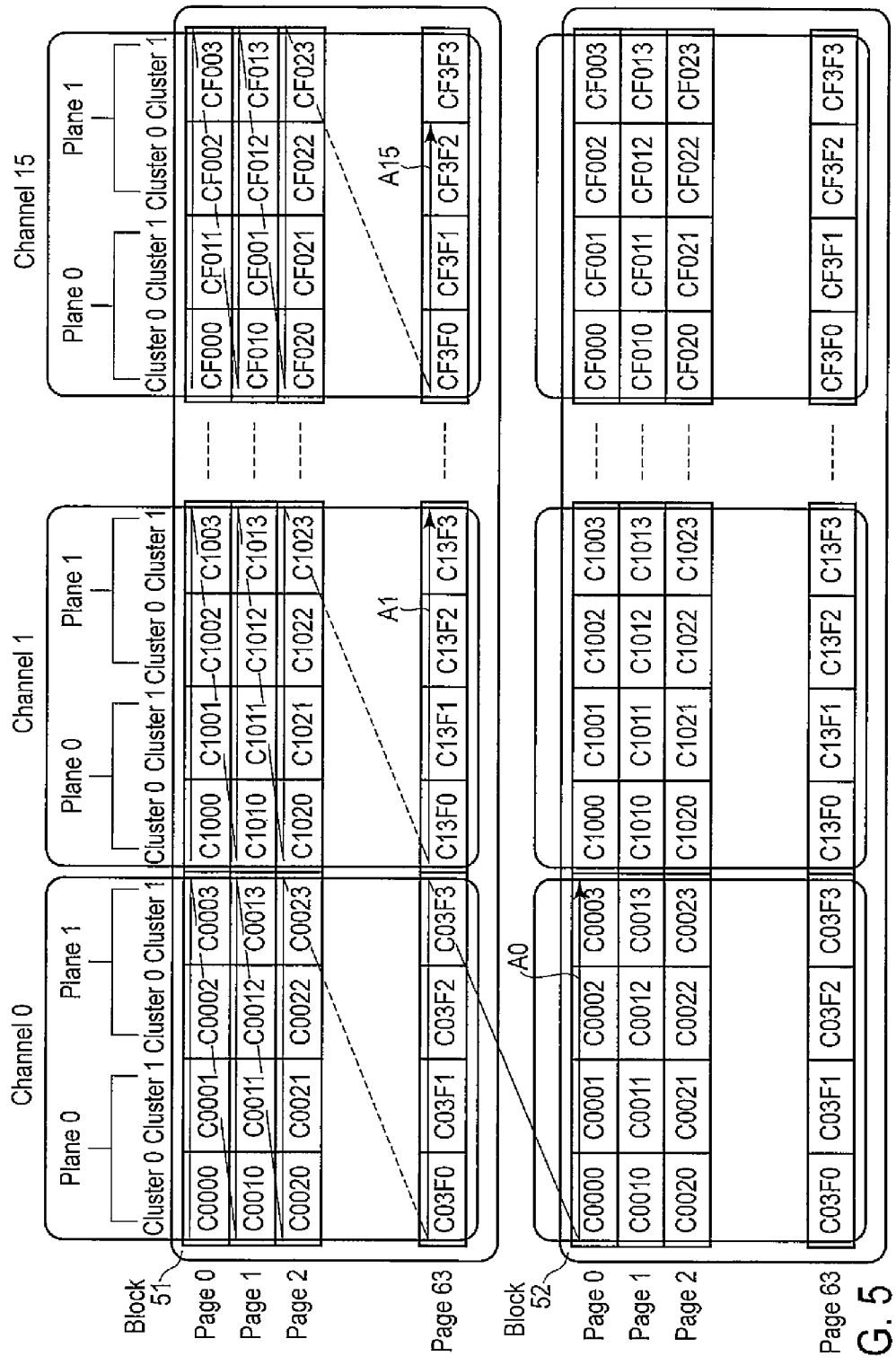
FIG. 5 is a diagram illustrating an example of a search for valid clusters in each channel which search is applied in the embodiment.

FIG. 5 is a diagram illustrating an exemplary search for valid clusters in each channel p carried out by the valid-cluster search module 32 and applied in the embodiment. FIG. 5 shows two blocks (logical blocks) 51 and 52 being subjected to a compaction process. The blocks 51 and 52 are the leading two of three blocks in the compaction-processing block list 204 shown in FIG. 2. A final block in the compaction-processing block list 204 is omitted from FIG. 5. In FIG. 5, arrows A0, A1, ..., and A15 indicate migration pathways of search pointers P0, P1, ..., and P15 in the channels 0, 1, ..., and 15. That is, arrows A0, A1, ..., and A15 indicate the order of searches for valid clusters in the channels 0, 1, ..., and 15.

For example, for the channel 0 (p=0), the valid-cluster search module 32 checks whether the clusters are valid based on the search pointer P0 in the following order: C0000, C0001, C0002, C0003, C0010, C0011, ... as shown by arrow A0. In the embodiment, the check is carried out by indirectly referencing a bit map described below, via the main controller 22. However, the valid-cluster search module 32 may directly reference the bit map. Upon checking whether one cluster is valid, the valid-cluster search module 32 advances the search pointer P0 so that the search pointer P0 points to the next cluster in the channel 0.

In block 402, the valid-cluster search module 32 skips invalid clusters and continues searches in the respective channels P until up to four valid clusters are found. During the search, the valid-cluster search module 32 also skips corresponding clusters in NULL physical blocks (hereinafter referred to as NULL clusters). The NULL physical block has an error rate exceeding a specified value as a result of temporal changes in the NAND flash memory 11. The valid clusters, invalid clusters, and NULL physical blocks are managed by the block manager 24 as described below.

The maximum number of valid clusters searched for by the valid-cluster search module 32, that is, four, is equal to the number of clusters corresponding to the channel p. The number of valid clusters searched for is normally equal to the maximum number of 4. However, if the final valid clusters (or valid clusters) used for compaction are searched for, the number of valid clusters searched for may be smaller than 4.

In the embodiment, as described above, to enable each logical page in the block (logical block) to be subjected to the ICP correction, any one of the 16 channels is allocated to the logical page for storing the error correction data (inter-channel parity data) for the ICP correction. The channels allocated for storing the inter-channel parity data are referred to as parity channels. In the embodiment, the parity channels are switched in units of pages. In a compaction process, when valid clusters in a plurality of blocks are collected and migrated (rewritten) to another block, inter-channel parity data is generated for each page. Thus, the clusters in the parity channel are not required for the compaction process.

Thus, in the above-described search in each channel p, the valid-cluster search module 32 skips not only the invalid clusters and NULL clusters but also the corresponding clusters in the parity channel (hereinafter referred to as parity clusters). The parity channel for each page is managed by the block manager 24.

In the example in FIG. 5, it is assumed that a search for valid clusters has progressed most in the channel 0 and that in the channel 0, the search is now being carried out on the page 0 in the block 52. In contrast, a search for valid clusters in, for example, the channels 1 and 15, has progressed only to the page 63 in the block 51. In this manner, the progress of the search for valid clusters varies among the channels. Thus, the progress of generation (issuance) of compaction read commands varies among the channels. The reason why the search for valid clusters has progressed most in the channel 0 is that for example, in the block 51, the number of valid clusters included in the clusters corresponding to the channel 0 is smaller than those in the clusters corresponding to the other channels. However, the embodiment utilizes a technique to reduce variations in progress among the channels as described below.

The block manager 24 manages 32 physical blocks assigned to each block (logical block) using, for example, a block management table. The block management table is held in the block manager 24 (more specifically, in an area in a memory such as DRAM which is assigned to the block manger 24). In the embodiment, the block manager 24 manages the information representing whether the physical blocks are null, using the block management table. The block manager 24 also manages the information representing whether each channel for pages 0 to 63 corresponding to a physical block is a parity channel, using the block management table.

The block manager 24 further manages the information representing whether 64 clusters forming each page in a block are valid or invalid, using a bit map (bit map table). The bit map corresponding to one page comprises 64 bits corresponding to the 64 clusters and is held in the block manager 24 (more specifically, in an area in a memory such as DRAM which is assigned to the block manger 24). In the embodiment, 64 bit maps are used per block.

The command list generator 33 generates a set (compaction read command set) of read commands for a compaction read (hereinafter referred to as compaction read commands) based on valid clusters searched for in each channel by the valid-cluster search module 32 (block 403). The compaction read command set is generated in units of pages in the block (logical block) to which valid clusters are migrated (this block is a compaction destination). A free block managed by the free-block list manager 36 is used as the block to which valid clusters are migrated. In this case, the block used as the one to which valid clusters are migrated is excluded from the free block list.

Each of the compaction read commands specifies that a read be carried on one valid cluster. The NAND interface 21 can carry out compaction read commands in units of one cluster over up to 16 channels in parallel. Thus, up to four compaction read commands are included in the compaction read command set for each channel.

In the embodiment, the NAND interface 21 automatically generates a write command in units of pages (logical pages) based on data read from the NAND flash memory 11 by carrying out the compaction read commands. As described above, one page comprises 64 clusters. Thus, if any one of the 16 channels is allocated to each page as the parity channel as in the embodiment, the NAND interface 21 can simultaneously write up to 60 clusters to the NAND flash memory 11 via the 15 (60/4) channels. Moreover, if one or more NULL physical blocks are present in the block to which the data is to be migrated, the maximum number N of clusters that can be written simultaneously is equal to 60 (clusters) minus the product of the number of the NULL physical blocks and 4 (clusters). The number of channels corresponding to N is N/4.

Thus, in block 403 described above, the command list generator 33 generates compaction read commands required to read valid clusters in order from the channel (here the channel 0) indicated by the start command channel number SCN until the maximum number N of clusters calculated based on the above-described conditions is reached. Each of the compaction read commands contains a physical address that specifies a cluster to be read (migrated). To generate the compaction read commands, the command list generator 33 converts logical addresses that specify the clusters to be read into physical addresses.

FIG. 6 shows an example of formats of a logical address and a physical address applied in the embodiment. The logical address comprises the logical block ID of the logical block to which the corresponding cluster belongs, a page number, a plane number, a channel number, and a cluster number. In the embodiment using the NAND flash memory 11 in the memory system 10, the logical address is also referred to as a logical NAND cluster address. The physical address comprises a physical block ID that identifies the physical block to which the corresponding cluster belongs, a plane number, a page number, a cluster number, and a sector number. The physical address is also referred to as a physical NAND cluster address. A well-known logical-to-physical address translation (LPT) table is used to convert the logical address into the physical address. The LPT table is held and managed by a table manager (not shown in the drawings).

The command list generator 33 provides the set of generated compaction read commands, that is, the compaction read command set (command list), to the command issue module 35. The command list generator 33 also notifies the channel manager 34 of the channel number (hereinafter referred to as the final command channel number) of the channel to which the cluster specified by the final compaction read command in the command list belongs.

The command issue module 35 issues, to the NAND interface 21, compaction read commands included in the compaction read command set in units of N/4 compaction read commands (block 404). The compaction read command set is received from the command list generator 33. The N/4 compaction read commands have different channel numbers. The compaction read commands issued to the NAND interface 21 are stored in a command queue (not shown in the drawings) in the NAND interface 21.

The NAND interface 21 takes N/4 compaction read commands out from the command queue in the order in which the compaction read commands are stored. Based on the taken-out N/4 compaction read commands, the NAND interface 21 accesses the NAND flash memory 11 in parallel via the corresponding channels. Thus, the NAND interface 21 reads N/4 clusters (valid clusters) in parallel from the NAND interface 11. The NAND interface 21 repeats the above-described operation four times to obtain N clusters to be written to one page in the migration destination block (block 405).

The NAND interface 21 generates a set (compaction write command set) of write commands (hereinafter referred to as compaction write commands) required to write the obtained N clusters to the corresponding page in the migration destination block so that the clusters are written in the respective channels, on the respective planes, at the respective cluster positions. The compaction write command set includes four compaction write commands required to write four clusters corresponding to the parity channel so that the clusters are written on the respective planes at the respective cluster positions. Each of the compaction write commands includes a physical address that specifies a position where the corresponding cluster is written. To generate the compaction write commands, the NAND interface 21 converts logical addresses that specify positions where the corresponding clusters are to be written, into physical addresses. The NAND interface 21 accesses the NAND flash memory 11 in parallel based on the generated compaction write command set. The NAND interface 21 thus simultaneously writes the N clusters obtained in block 405 to the migration destination block (block 406). Hence, one process for the compaction is completed.

The main controller 22 determines whether one or more valid clusters remain which are to be migrated to the migration destination block (block 407). If one or more valid clusters to be migrated remain (Yes in block 407), the main controller 22 passes control to the command list generator 33. Then, the command list generator 33 functions as a start channel determination module. Then, to generate the next command list (compaction read command set), the command list generator 33 determines the next start command channel number based on the situation of issuance of the compaction read commands (block 408). The situation of issuance of the compaction read commands corresponds to the situation of the search of the valid clusters in each channel.

In the embodiment, the situation of issuance of the compaction read commands is managed by the channel manager 34. The channel manager 34 manages the situation of issuance of the compaction read commands based on, for example, the final command channel number sent from the command list generator 33. The final command channel number is the channel number of the channel corresponding to the final compaction read commands included in the read commands most recently issued (last issued) to the NAND interface 21 (more specifically, the channel corresponding to the cluster specified by the final compaction read command belongs to this channel).

Then, to determine the next start command channel, the command list generator 33 receives the final command channel number from the channel manager 34. The command list generator 33 determines the next start command channel number based on the received final command channel number, and proceeds to block 409. In block 409, the command list generator 33 functions again as a start channel setting module to update the start command channel number SCN to the determined next start command channel number. In the embodiment, the start command channel number SCN is determined as follows based on a round robin algorithm.

It is assumed that during the first search of the valid clusters, the channels 0 to 14 are processed and that for the channels 0 to 14, the corresponding compaction read commands are generated in order from the channel 0 to the channel 14. That is, it is assumed that the final command channel number for the first process is 14. In this case, the command list generator 33 determines the next (second) start command channel number SCN to be a channel number 15 succeeding the final command channel number 14 for the first process. Thus, in block 409 described above, the start command channel number SCN is updated from 0 (initial value) to 15. If the final command channel number SCN is 15, which is indicative of the last of the channels 0 to 15, the next start command channel number SCN is 0 according to the embodiment utilizing the round robin algorithm.

When the start command channel number SCN is updated to 15 (block 409), the valid-cluster search module 32 again starts searching for valid clusters in each channel p based on the search pointer Pp (block 402). Thus, during the second process (block 403), the command list generator 33 generates N compaction read commands in the following order, the channel 15, the channel 0, the channel 1, . . . .

The channel manager 34 may function as a determination module to determine the next start command channel number SCN based on the round robin algorithm. That is, the channel manager 34 may carry out block 408 described above. In this case, the channel manager 34 may notify the command list generator 33 of the determined start command channel number SCN. Furthermore, a determination module independent of the command list generator 33 and the channel manager 34 may determine the next start command channel number SCN.

Moreover, the channel manager 34 may function as a start channel setting module to carry out block 401 described above. That is, for the first process, the channel manager 34 may initialize the start command channel number SCN at an appropriate timing, for example, at the beginning of the first process. Likewise, the channel manager 34 may carry out block 409 described above.

Thus, in the embodiment, valid clusters to be read from a plurality of blocks in a fragmented state are searched for in each channel in order starting from the leading page. Thus, the embodiment improves the parallelism of the process of reading valid clusters via a plurality of channels for compaction. That is, valid clusters can be read with increased parallelism. This enables a reduction in the time required for the whole compaction process without the need for a dedicated storage area for migration of valid clusters.

Here, it is assumed that the valid clusters in the plurality of blocks in the fragmented state are searched in units of pages across all the channels in order starting with the leading page, unlike in the case of the embodiment. The blocks in the fragmented state are likely to involve many channels in which no valid cluster is present in the same page. Such pages contribute to reducing the parallelism of reading of valid clusters. Such a situation is likely to occur in all the pages in the plurality of blocks. This increases the time required for the whole compaction process.

Furthermore, in the embodiment, for each parallel read process, the start command channel number SCN is switched to the subsequent one based on the round robin algorithm. Thus, channels not used during the last parallel read process are preferentially utilized during the next parallel read process. Hence, even though valid clusters are searched for in each channel, the parallelism of reading of valid clusters can be increased, with variations in progress among the channels reduced. This enables a further reduction in the time required for the whole compaction process.

The technique to reduce variations in progress among the channels is not limited to the above-described embodiment. For example, if the progress for the channel indicated by the start command channel number SCN is most advanced in the 16 channels, the start channel may be changed to the subsequent channel. Alternatively, the start command channel number SCN may be randomly determined.

Moreover, the channel manager 34 may manage the situation of issuance of compaction read commands based on the last progress in each channel. In this case, the determination module (the channel manager 34 or command list generator 33 functioning as a determination module) may determine channels corresponding to N compaction read commands to be generated so that a channel with the most advanced command issuance is excluded from the channels. Alternatively, the determination module may determine the channels such that a channel with the most belated command issuance is included in the channels. Alternatively, the determination module may determine the channels such that a channel with the most advanced command issuance is excluded from the channels, whereas a channel with the most belated command issuance is included in the channels.

At least one of the above-described embodiments can provide a memory system having multiple channels to enable an increase in the speed of data read for compaction without the need for a storage area intended for compaction, as well as a method for generating read commands for compaction in the memory system.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a memory configured to be accessed via a first number of channels;
   a memory interface configured to access the memory in parallel via the first number of channels;
   a valid-cluster search module configured to sequentially search valid clusters included in first blocks, in each of the channels, for compaction in which the valid clusters are migrated from the first blocks to a second block;
   a read command generator configured to generate read commands used to read, in parallel, valid clusters to be migrated to the second block, wherein the valid clusters searched in each of the channels comprise the valid clusters to be migrated, and the valid clusters to be migrated correspond to a number of clusters simultaneously written to the second block and to a second number of channels in the first number of channels;
   a command issue module configured to issue the read commands to the memory interface via the second number of channels; and
   a determination module configured to determine the second number of channels corresponding to read commands to be generated next based on a situation of issuance of the read commands.

2. The memory system of claim 1, further comprising a channel manager configured to manage the situation of issuance of the read commands based on a position of a first channel corresponding to a final read command in the read commands issued last to the memory interface,
   wherein the determination module is further configured to determine a leading, second channel of the second number of channels based on the position of the first channel.

3. The memory system of claim 2, wherein:
   the determination module is further configured to determine the second channel to be a channel following the first channel in the first number of channels based on a round robin algorithm; and
   the command list generator is further configured to generate the read commands in order starting with a read command to be issued to the second channel.

4. The memory system of claim 1, further comprising a channel manager configured to manage the situation of issuance of the read commands based on a last progress in each of the channels,
   wherein the determination module is further configured to determine the second number of channels so that a channel to which progress of command issuance is most advanced is excluded from the second number of channels.

5. The memory system of claim 4, wherein the determination module is further configured to determine the second number of channels so that a channel to which the progress of the command issuance is most advanced belated is included in the second number of channels.

6. The memory system of claim 1, further comprising a channel manager configured to manage the situation of issuance of the read commands based on a last progress in each of the channels,
   wherein the determination module is further configured to determine the second number of channels so that a channel to which progress of command issuance is most advanced belated is included in the second number of channels.

7. A method of generating read commands for compaction in which valid clusters are migrated from first blocks to a second block, in a memory system comprising a memory accessed via a first number of channels and a memory interface accessing the memory in parallel via the first number of channels, wherein the method comprises:
   sequentially searching valid clusters included in the first blocks, in each of the channels;
   generating the read commands used to read, in parallel, the valid clusters to be migrated, wherein the valid clusters searched in each of the channels comprise the valid clusters to be migrated, the valid clusters to be migrated correspond to a number of clusters simultaneously written to the second block and to a second number of channels in the first number of channels;
   issuing the read commands to the memory interface via the second number of channels; and
   determining the second number of channels corresponding to read commands to be generated next based on a situation of issuance of the read commands.

8. The method of claim 7, further comprising managing the situation of issuance of the read commands based on a position of a first channel corresponding to a final read command in the read commands issued last to the memory interface,
   wherein the determining the second number of channels comprises determining a leading, second channel of the second number of channels based on the position of the first channel.

9. The method of claim 8, wherein:
   the second channel is determined based on a round robin algorithm and follows the first channel in the first number of channels; and
   the read commands are generated in order starting with a read command to be issued to the second channel.

10. The method of claim 7, further comprising managing the situation of issuance of the read commands based on a last progress in each of the channels,
    wherein the determining of the second number of channels further comprises excluding a channel to which progress of command issuance is most advanced from the second number of channels.

11. The method of claim 10, wherein the determining of the second number of channels further comprises including a channel to which the progress of the command issuance is most advanced belated in the second number of channels.

12. The method of claim 7, further comprising managing the situation of issuance of the read commands based on a last progress in each of the channels,
    wherein the determining of the second number of channels further comprises including a channel to which the progress of the command issuance is most advanced belated in the second number of channels.

* * * * *